United States Patent
Reber

[15] 3,690,055
[45] Sept. 12, 1972

[54] AGRICULTURAL MACHINE WITH ARTICULATED FRAME AND ROTARY IMPLEMENTS

[72] Inventor: Walter Reber, Saverne, France

[73] Assignees: Societe Dite: Kuhn Freres & Cie., Saverne (Bas-Rhin), France; Societe En Commandite Simple, Saverne (Bas-Rhin), France

[22] Filed: July 11, 1969

[21] Appl. No.: 841,035

[30] Foreign Application Priority Data

July 18, 1968    France.......................689222

[52] U.S. Cl................................................56/370
[51] Int. Cl..............................................A01d 79/02
[58] Field of Search................................56/370, 372

[56] References Cited

UNITED STATES PATENTS

| | | |
|---|---|---|
| 3,496,712 | 2/1970 | Purrer et al..................56/370 |
| 3,006,133 | 10/1961 | Van der Lely et al...56/370 X |

FOREIGN PATENTS OR APPLICATIONS

| | | |
|---|---|---|
| 1,377,992 | 9/1964 | France.........................56/370 |
| 997,687 | 7/1965 | Great Britain...............56/370 |
| 113,955 | 3/1968 | Netherlands................56/370 |
| 437,889 | 11/1967 | Switzerland.................56/370 |

*Primary Examiner*—Louis G. Mancene
*Assistant Examiner*—J. N. Eskovitz
*Attorney*—Ernest G. Montague

[57] ABSTRACT

The disclosure is of an agricultural machine, for example a tedding or swath-turning machine, comprising an articulated frame for towing and rotary implements mounted upon wheels or rollers or sledges or other carrier elements and adapted to be towed by an agricultural tractor or other vehicle, characterized in that the articulated frame has two articulations to permit the machine to follow the contours of the ground and these two articulations are disposed between the two carrier elements which are closest to the middle of the machine.

2 Claims, 12 Drawing Figures

PATENTED SEP 12 1972　　3,690,055

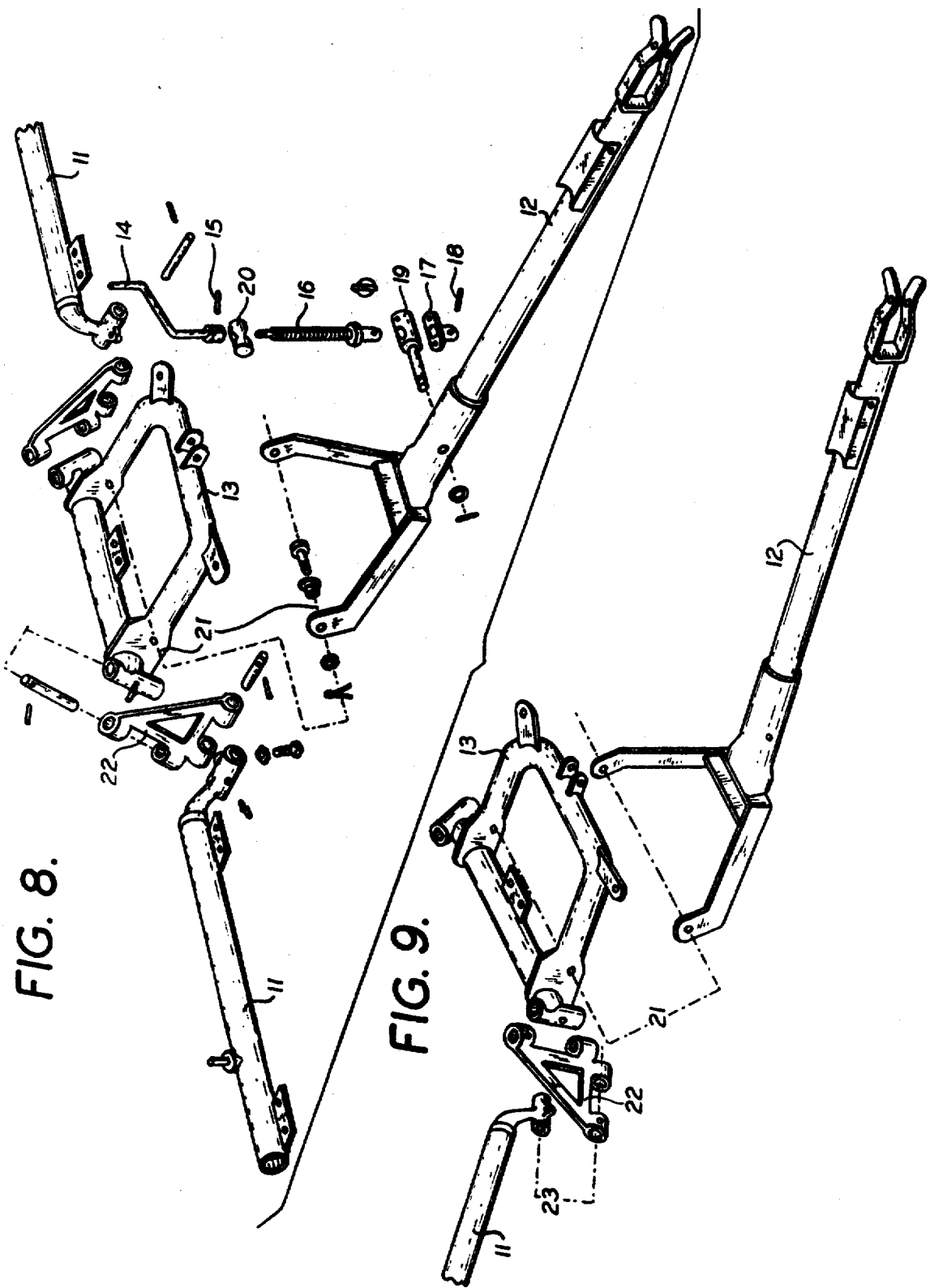

AGRICULTURAL MACHINE WITH ARTICULATED FRAME AND ROTARY IMPLEMENTS

INTRODUCTION AND BACKGROUND OF THE INVENTION

This invention relates to agricultural machines, for example tending machines or swath-turning machines of the kind (herein called "the kind referred to") comprising an articulated frame for towing and rotary implements mounted upon wheels or rollers or sledges or other carrier elements and adapted to be towed by an agricultural tractor or other vehicle.

In general the frame of a machine of the kind referred to is articulated in such a manner as to permit the rotary working elements (rake, forks or prongs or other implements) to follow the contours of the ground sufficiently closely. It is well understood that this facility is of very great importance, but nevertheless in the majority of the known machines it involves certain disadvantages.

Thus, for example, as shown by FIGS. 1a and 1b of the accompanying drawings as far as concerns the interpositioning in operation of the forks, this varies as a function of the contours of the ground, particularly in the zones where the direction of rotation of the two rotary implements immediately adjacent to each other is convergent towards the front (regarding this in the direction of travel indicated by the arrow O) to the contact with the hay or other product to be treated, that is between the rotary rakes 1 and 2 and between the rotary rakes 3 and 4. This variation of the interpositioning and cooperation in the working zones naturally impairs to a considerable extent the quality and the efficiency of the work of the machine, especially if the terrain is very rough (see FIG. 1a).

Another disadvantage of the known machines of the kind referred to resides in their width, which is generally very substantial in spite of the possibility of folding or retracting arms supporting the rotors for the purpose of transporting the machine on a road.

Furthermore, with the majority of machines of the kind referred to, known hitherto, it is necessary to effect an adjustment of the inclination of the rotary rakes at the time of each change from the working position to the transportation position and vice versa. The reason for the necessity of these adjustments, which are troublesome not only because of the losses of time which they involve, but also still more because of the expensive adjusting devices which are necessitated, as may readily be comprehended, is to obtain efficiency. In practice, in the working position, the rotors must have a particular inclination, generally towards the front, according to the desired angle of attack (FIG. 3) whilst in the position for transportation it is logical to seek above all to obtain a good clearance above the ground, which clearance is at its maximum when the axes of the rotary rakes are perpendicular to the ground surface (FIG. 4).

With a view to alleviating or avoiding the various disadvantages indicated above of the known machines of the kind referred to, the invention is intended to provide such machines with various improvements which include on the one hand disposing the two articulations of the frame for permitting the machine to follow the contours of the ground between the central carrier elements, and on the other hand, due to the dispositioning of these two articulations, to advantageously reduce the overall width of the machine in its folded condition by folding about these two articulations, and finally to dispose the hinge axes of foldable rotor-carrying arms obliquely so as to give different inclinations to the rotors according to whether they are in the working position or in the folded or transportation position.

BRIEF SUMMARY OF THE INVENTION

According to the invention there is provided an agricultural machine of the kind referred to, wherein the articulated frame has two articulations to permit the machine to follow the contours of the ground and these two articulations are disposed between the two carrier elements which are closest to the middle of the machine.

FURTHER DESCRIPTION AND ADVANTAGES OF THE INVENTION

Preferably the machine comprises foldable arms each of which has a hinge axis which is disposed not vertically but slanting upwardly towards the axis of the machine and consequently towards the exterior of the traversed strip of ground, thereby giving different inclinations to the rotary implements both when in their working positions and when in their folded positions, that is to say in their stowed positions for transport. In an advantageous construction each of the foldable arms which is a rotor-carrier arm carrying one of said rotary implements has a second hinge axis which is disposed transversely to the direction of travel when the machine is in its folded condition for transport. The machine may advantageously comprise means for the attachment of the said frame for towing such that the depth of operation reached by the rotary implements depends upon the frame for towing when the machine is in its operative condition, but that a tow-bar can turn freely up and down so as to permit the machine to follow all the contours of the ground without any particular manipulation when the lateral foldable arms are folded. The machine may also comprise a rotary handle mechanism for manual adjustment of the depth of operation, the mechanism being operatively connected by a first nut to the tow-bar and by a second nut to the frame, thus obtaining by rotation of the handle a rotation of the frame and of the rotary rakes-carrier arms about an axis of articulation, and so that when in the, condition for transport the tow-bar (because of the positions of the hinge axes of the rotor-carrier arms) can turn freely up-and-down, the frame for towing and parts assembled therewith being able in effect to turn about an axis of articulation of the hinges of the rotary rakes rotor-carrier arms without causing variations of the positions of these arms.

BRIEF DESCRIPTION OF THE VIEWS IN THE DRAWINGS

The invention is defined in the claims hereinafter, and how it may be performed is further described below with reference to the accompanying drawings, in which by way of example:

FIGS. 1a and 1b show diagrammatically, respectively in a view in elevation and in a plan view, the position of the two articulations of the frame in a known machine of the kind referred to, FIGS. 2a and 2b and 2c show respectively in two views in elevation and in a plan view the disposition of the two articulations of the frame of a machine in accordance with the invention, FIGS. 3 and 4 are diagrams illustrating the inclination of the rotary rakes with respect to the ground in the operative condition and in the position for transportation, respectively FIG. 5 is a detail perspective view illustrating the inclined positions of the hinge axes of the foldable arms with respect to the frame, FIGS. 6 and 7 are respectively a detail front elevation and a side elevation illustrating the double articulation of the foldable arms in accordance with a feature of the invention, and FIGS. 8 and 9 are views illustrating various disassembled components involved in the connection of a tow-bar and the machine frame, respectively, for the unfolded position of the machine and for the folded or transport position of the machine.

DETAILED DESCRIPTION OF THE PREFERRED EMBODIMENT

Figure 1A:
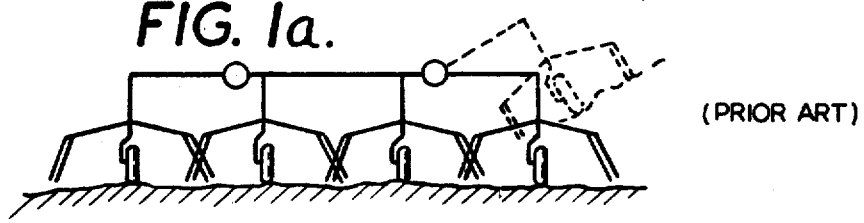
Figure 1B:
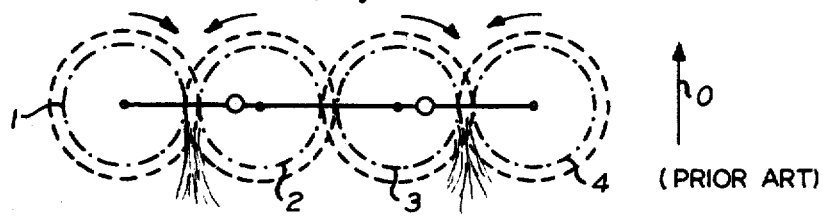
Figure 2A:
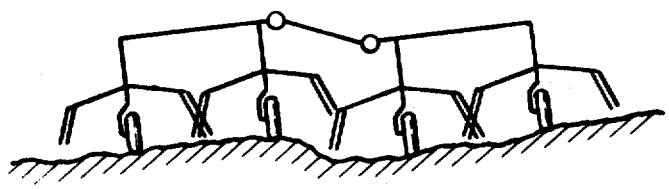
Figure 2B:
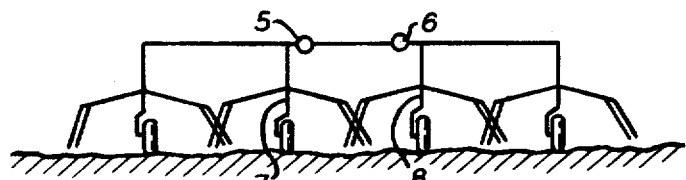
Figure 2C:
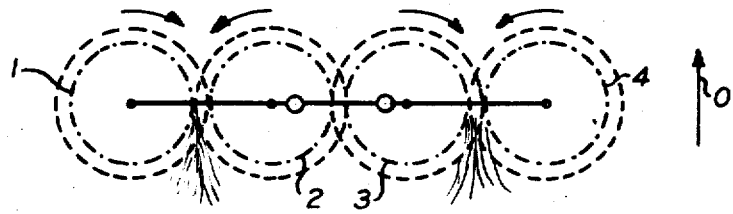

Thus, as represented in FIGS. 2a and 2b and 2c and in accordance with an important feature of the invention the two articulations 5 and 6 of the frame of the machine, which articulations permit the machine to follow the contours of the traversed ground, are disposed between the carrier elements 7 and 8 which are closest to the middle of the machine.

In this way, on the one hand, there is obtained a constant interpositioning or mutual cooperation in the active working zones between the rotary rakes 1 and 2 and between the rotary rakes 3 and 4 and, on the other hand, a reduction of the risk of interference because the interpositioning or mutual cooperation between the rotary rakes is variable only in one instance and that is between the rotary rakes 2 and 3 which rotate in such directions that they diverge from each other towards the front to contact the hay or other product to be treated, and therefore this occurs in a zone which is much less critical than that in known machines of the kind referred to.

According to a further feature of the invention it is possible, due to the position of the folding hinges between the two carrier elements 7 and 8 closest to the middle of the machine, to advantageously reduce the overall width of the machine when in the folded state.

Figure 3:
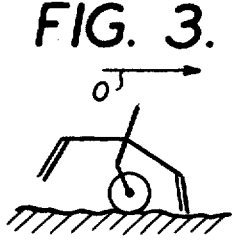
Figure 4:
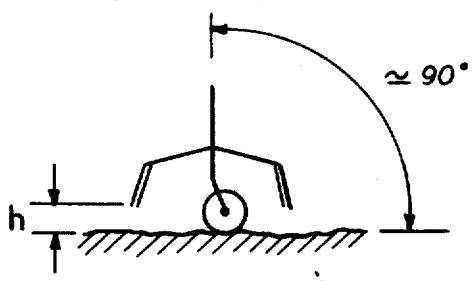

FIG. 3 indicates how the axis of rotation of the rotary rakes is inclined upwardly and forwardly in the direction of travel indicated by the arrow O when the machine is operating. FIG. 4 illustrates how the axis of rotation is perpendicular to the surface of the ground to obtain a maximum clearance h when the machine is folded for transport.

With a view to avoiding the adjustments of the inclination of the rotors at the time of each change from the working condition to the transport condition and vice versa, the hinge axes of the foldable rotary rakes carrier arms are, in accordance with a further feature of the invention, on the one hand placed between the carrier elements which are closest to the middle of the machine as already mentioned above, and, on the other hand, are disposed not vertically but obliquely or slanting upwards towards the axis of the machine and consequently towards the exterior of the traversed strip of ground. This dispositioning of the hinge axes gives different inclinations to the axes of the rotary rakes according to whether they are in the operating condition or in the folded or transport condition (FIG. 5).

Figure 5:
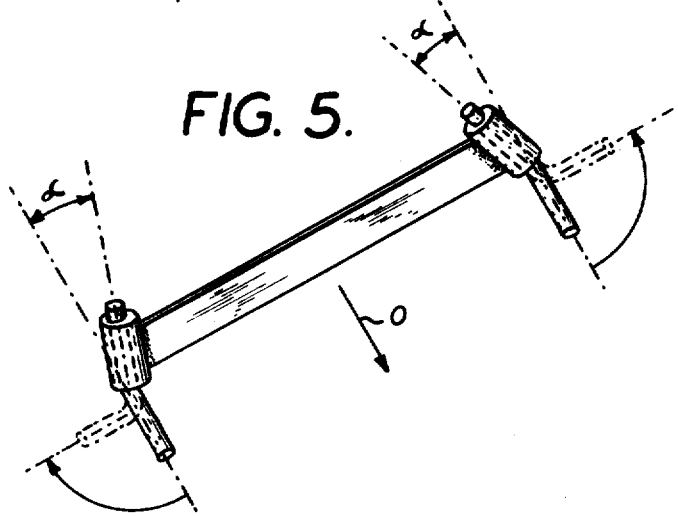
Figure 7:
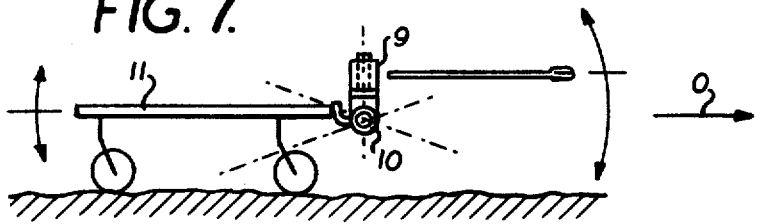

FIGS. 5 and 7 show how the angle (relative to the vertical direction b) rotary rakes-carrier arms is selected, taking account in conjunction with other factors of the inclination of the rotary rakes in the operative condition so that as a result only of the simple fact of folding of the rotary rakes carrier arms, the axes of the rotary rakes assume each a position substantially perpendicular to the surface of the ground. The clearance of the rotary rakes above the ground for transport is then such that an adjustment of the height on the wheels becomes superfluous, whence are derived the advantages of avoiding the provision of a costly adjustment mechanism and of a gain of the time available for utilization of the machine. The desired inclination is preserved both for the working condition and for the transport condition in spite of changes from one condition to the other.

Figure 6:
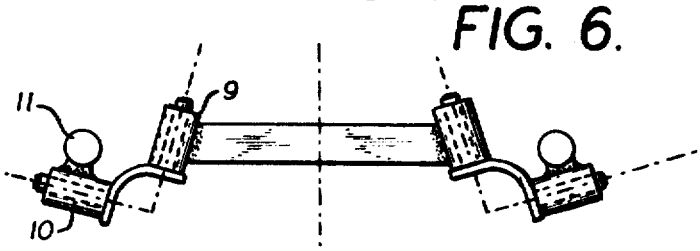

In accordance with a further feature of the invention, and as illustrated by FIGS. 6 and 7, the foldable arms have two articulations, the first articulation 9 permitting the folding towards the rear of the rotary rakes carrier arms 11 and being selected as indicated herein above, and the second articulation 10 being disposed transversely with respect to the direction of travel of the machine in the folded condition (direction indicated by the arrow 0 in FIG. 7) thus allowing each rotary rakes-carrier arm to be freely turned upwards or downwards.

This feature of the invention makes it possible to obtain a constant resting on the ground of all the carrier elements of the machine, even upon rough terrains, by which are derived the advantages of a substantially uniform distribution of the loads on more than two carrier elements, usually four wheels, tending to suppress a lack of uprightness which could be a source of unfavorable constraints, and furthermore there is a reduction of the pressure exerted by each carrier element, thereby allowing a construction which is light and flexible and less cumbersome and relatively less costly.

In accordance with a further feature of the invention the attachment of the tow-bar to the frame is effected in a manner such that the depth of operation reached by the rotary implements depends upon the tow-bar when the machine is unfolded, that is to say in the condition for operation, but after the lateral arms have been folded, the tow-bar can be turned freely upwards or downwards in order to allow the machine to follow all the variations in the contours of the traversed ground without any special manipulation.

For this purpose, as illustrated by FIG. 8 which relates to the operative condition of the machine, a rotary handle mechanism comprising a handle 14, pin 15, screw 16, pin member 17 and pin 18, is provided for adjusting the depth of operation, that is to say the inclination of the rotary rakes with respect to the ground, and is attached on the tow-bar 12 by means of a nut 19 and is operatively connected to the frame 13 at the central rear parallel oriented flanges of the frame 13 of the machine by means of a nut 20. Thus, by rotating the handle 14, it is possible to cause simultaneously the turning pivotal of the frame 13 and consequently of the rotary rakes-carrier arms 11 about an axis 21 of articulation. Consequently it is possible to adjust the depth of operation in a very precise manner.

When the machine is in its rearwardly folded condition for transport the tow-bar 12 (FIG. 9), because of the dispositions of the hinges 22, can pivotally turn freely upwardly or downwardly. In practice the assembly of tow-bar 12 and frame 13 can turn about the axis 23 of articulation without causing variations in the positions of the rotary rakes carrier arms 11.

What is claimed is:

1. An agricultural machine, for example a tedding machine or a swath-turning machine, comprising
    a frame,
    two arms, each pivotally connected to said frame and axially aligned constituting an operative position of said machine,
    said arms being foldable rearwardly into a substantially parallel position and constituting a transportation position of said machine,
    said machine includes a plurality of rotary rakes all operatively positioned on said arms,
    a tow-bar connected to said frame and adapted to be connected to a tractor,
    a control means for operatively varying the inclination, in said operating position, of said rotary rakes and said control means mounted on said tow-bar,
    said frame and said tow-bar are freely pivotally movable in a vertical plane when in said transportation position,
    a hinge operatively pivotally connecting each of said arms to said frame, and including a substantially vertically disposed first pivot axis pivotally connecting said hinge to said frame and a second substantially horizontally disposed second pivot axis connecting said arm to said hinge,
    said first pivot axes of both of said hinges converge angularly towards each other in an upward direction,
    said frame is pivotally connected to said tow-bar about a horizontal axis, and
    said control means comprises a screw threaded rotary handle crank connected operatively to said tow-bar and to said frame at positions thereon spaced from said horizontal axis.

2. An agricultural machine, for example a tedding machine or a swath-turning machine, comprising
    a frame,
    two arms, each pivotally connected to said frame and axially aligned constituting an operative position of said machine,
    said arms being foldable rearwardly into a substantially parallel position and constituting a transportation position of said machine,
    said machine includes a plurality of rotary rakes all operatively positioned on said arms,
    each of said arms operatively pivotally connected to said frame, and including a substantially vertically disposed first pivot axis operatively pivotally connecting each of said arms to said frame and a second substantially horizontally disposed second pivot axis operatively connecting each of said arm to said frame, and
    said first pivot axes of both of said arms converge angularly towards each other in an upward direction.

* * * * *